United States Patent [19]

Kawazoe

[11] 4,329,735
[45] May 11, 1982

[54] ROTARY HOT SHOE MECHANISM

[76] Inventor: Michio Kawazoe, 30-11 5 chome Higashi, Narita Suginami ku, Tokyo, Japan

[21] Appl. No.: 107,273

[22] Filed: Dec. 26, 1979

Related U.S. Application Data

[63] Continuation of Ser. No. 935,652, Aug. 21, 1978, abandoned.

[51] Int. Cl.³ .................................................. G03B 15/02
[52] U.S. Cl. ...................................... 362/18; 362/109; 362/287; 362/322
[58] Field of Search .................. 362/18, 109, 287, 322

[56] References Cited
U.S. PATENT DOCUMENTS
3,603,781 9/1971 Kobayashi et al. ............... 362/18 X Primary Examiner—Stephen J. Lechert, Jr.
Attorney, Agent, or Firm—Donald D. Mon

[57] ABSTRACT

A rotary hot shoe mechanism in which the hot shoe can be rotated and enabled to select the direction of strobe light in a desired angle.

6 Claims, 3 Drawing Figures

4,329,735

ROTARY HOT SHOE MECHANISM

This is a continuation, of application Ser. No. 935,652, filed Aug. 21, 1978, now abandoned.

BACKGROUND OF THE INVENTION

The present invention relates to a rotary hot shoe mechanism for a strobo grip, adapted for use with a camera holder, camera bracket or camera and the like, and more particularly relates to a rotary hot shoe mechanism in which the hot shoe can be rotated and enabled to set the direction of the strobo light in a desired angle relative to the direction of the camera and permit bounce photographic lighting in a horizontal direction.

Hitherto, in a conventional hot shoe, mechanism, the hot shoe is rigidly fixed on the strobo grip, therefore the direction of the strobo light is fixed in the same direction as the camera, so that soft illumination from the strobo light was impossible.

BRIEF SUMMARY OF THE INVENTION

Therefore, it is an object of the invention to provide a rotary hot shoe mechanism in which the hot shoe can be rotated to select the desired angle for the strobo light, thus enabling the object to be illuminated softly.

Other objects and advantages of the invention will be apparent from the following explanation of the accompanying drawings.

DETAILED DESCRIPTION

Figure 1:
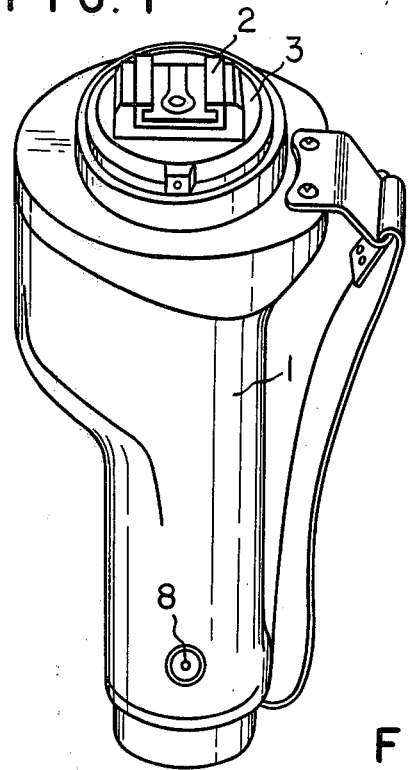
FIG. 1 is an elevation view of a strobo grip having a hot shoe mechanism according to present invention.
Figure 2:
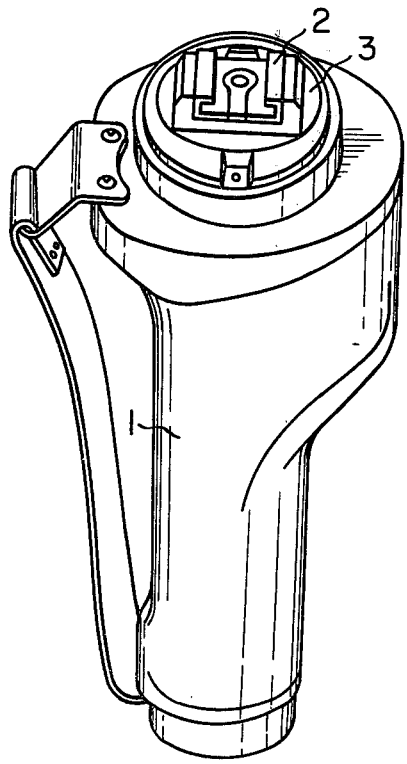
FIG. 2 is a rear view of said grip shown in FIG. 1.
Figure 3:
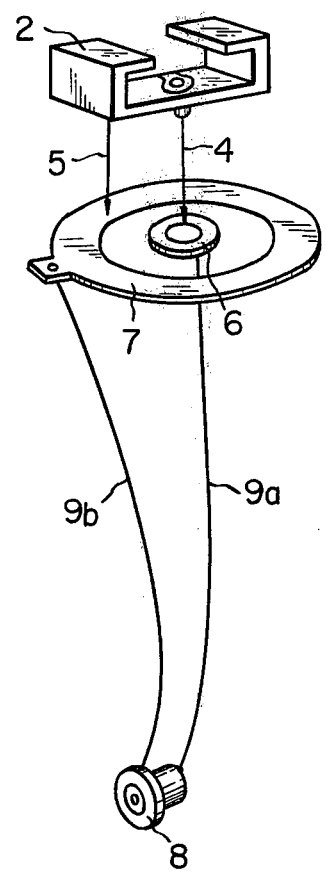
FIG. 3 is an exploded perspective view of the essential part of the present invention.

FIGS. 1 to 3 show an embodiment of the present invention, wherein 1 is a strobo grip, 2 is a hot shoe provided at the upper face of said strobo grip 1, 3 is a rotating mount provided at the upper face of the strobo grip. The hot shoe 2 is frictionally mounted on said mount 3 so as to be rotatable by the hand of the operator but not by the gravity force acting on the strobo mounted on said shoe such gravity force being insufficient to overcome the friction. A center contact 4 and ground contact 5 of said shoe 2 slidably contact the two ring shaped contacts 6 and 7 respectively which are fixed in said strobo grip 1. These fixed contacts 6 and 7 are connected to an X contact 8 provided at a lower part of the front face of grip 1 through lead wires 9a and 9b.

In the present invention, it is possible to rotate the strobo mounted on shoe 2 by hand in either the clockwise direction or counter clockwise direction through the range of 360 degrees together with shoe 2 and rotating mount 3. Therefore, it is possible to set the direction of the strobo light freely in a desired direction independent from the direction of the camera. For example, it is possible to illuminate the object by strobo light softly without producing a shadow using reflected light from a wall. In strobo photography the cable connector or X contact 8 of the grip 1 is connected to a cable connector or X contact of a camera through a PC-PC cable and the photographing is done by pushing the shutter button of the camera.

As explained above, in the present invention, it is possible to rotate the hot shoe and set the direction of the strobo light in the desired angle. Moreover in the present invention, it is possible to provide said X contact at a lower part of the front face of the grip, thereby enabling the cable connecting the X contact of the grip to the contact of camera to be put out of the way.

In said embodiment, the method for fixing said ring shaped contacts 6 and 7 concentrically and the means for slidably contacting contacts 4 and 5 to fixed contacts 6 and 7 are omitted from the drawing because they are a conventional structure. Furthermore, the hot shoe may be used for mounting only the strobo without utilizing an electrical contact.

What is claimed is:

1. A rotary hot shoe mechanism in which a hot shoe is mounted at the upper face of a strobo grip rotatably so as to be rotatable by the hand of an operator but not to be rotatable by gravity force acting on the strobo, a center contact and the ground contact of said shoe slidably engaging two ring shaped contacts respectively which are fixed in the strobo grip concentrically, said fixed contacts being connected to a cable connector.

2. Means for rotatably mounting a strobe to a grip, comprising:
   an upper face on the grip;
   a mount rotatably attached to said upper face;
   a shoe for holding said strobe frictionally attached to the mount so that the shoe can be rotated manually relative to the mount against the force of the friction, but will not rotate relative to the mount against the force of gravity only;
   said shoe having a first portion adapted to be placed at ground potential, and a second portion in the form of a contactor adapted to be placed at a potential different from ground potential;
   a first contact member and a second contact member fixed on said grip, said second contact member being positioned within said first contact member;
   a first electrical connection means between said first shoe portion and said first contact member; and
   a second electrical connection means between said second shoe portion and said second contact member.

3. Means according to claim 2 including cable connecting means on said grip, and means electrically connecting said first and second contact members to said cable connecting means.

4. Means for rotatably mounting a strobe to a grip comprising;
   an upper face on the grip;
   a first ring sloped contact fixed on said upper face;
   a second ring sloped contact fixed on the upper face concentric with the first;
   a strobe mounting shoe rotatably attached to said upper face
   said strobe mounting shoe have a first portion adapted to contact said first ring sloped contact, and a second portion adapted to contact said second ring sloped contact;
   a first contact member and a second contact member fixed on said grip, said second contact member being positioned within said first contact member;
   a first electrical connection means between said first shoe portion and said first contact member; and a second electrical connection means between said second shoe portion and said second contact member.

5. Means according to claim 4 in which
said first ring sloped contact has a socket; and
said first portion of said strobe mounting shoe has a post adapted to frictionally engage said socket in said first ring sloped contact so that the strobe mounting shoe can be rotated manually relative to the grip against the force of friction, but sill not rotate relative to the mount against the force of gravity only.

6. Means according to claim 2 in which said first contact member and second contact member comprise a pair of concentric ring shaped contacts respectively.